United States Patent [19]

Desbrandes et al.

[11] Patent Number: 4,495,605

[45] Date of Patent: Jan. 22, 1985

[54] METHOD FOR DETERMINING THE DIP ANGLE OF GEOLOGICAL FORMATIONS TRAVERSED BY A BOREHOLE

[75] Inventors: Robert Desbrandes, Sevres; Guy Norel, La Celle Saint-Cloud, both of France

[73] Assignee: Institut Francais du Petrole, Rueil-Malmaison, France

[21] Appl. No.: 283,323

[22] Filed: Jul. 15, 1981

[30] Foreign Application Priority Data

Jul. 15, 1980 [FR] France ................. 80 15587

[51] Int. Cl.³ ............................................ G01V 1/40
[52] U.S. Cl. ................................. 367/33; 73/152; 367/27; 367/30; 367/40; 367/29; 367/47
[58] Field of Search ............ 181/102, 104, 105; 367/27–31, 53, 33, 40, 47; 324/323, 367; 73/152

[56] References Cited

U.S. PATENT DOCUMENTS 3,376,950 4/1968 Grine ................................. 367/28
3,883,841 5/1975 Norel et al. ........................ 367/25

Primary Examiner—Maynard R. Wilbur
Assistant Examiner—K. R. Kaiser
Attorney, Agent, or Firm—Millen & White

[57] ABSTRACT

Acoustic signals are transmitted in a direction substantially perpendicular to the borehole axis, from different levels of at least three determined generatrices of the borehole wall. Reflected acoustic signals are received from the same direction at different levels of these generatrices. A train of signals is derived from each reflected acoustic signal and at least a group of significant elements of this signal train is selected. The groups of significant elements of the signals obtained for the different generatrices are correlated. The interval between signal trains corresponding to the maximum correlation corresponds to one and the same geological formation and is representative of the dip angle of this formation.

9 Claims, 8 Drawing Figures

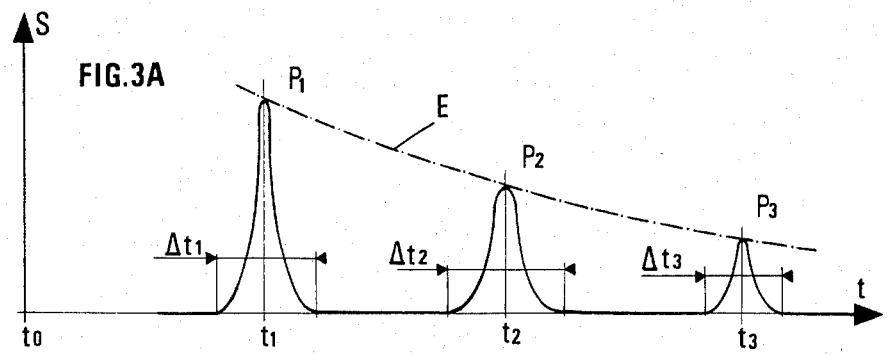
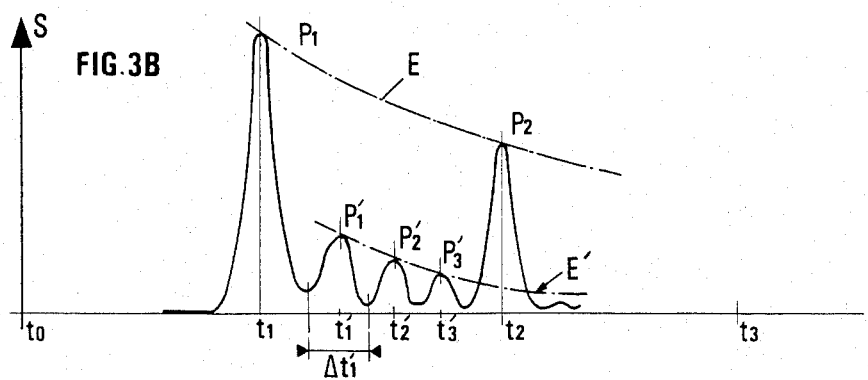
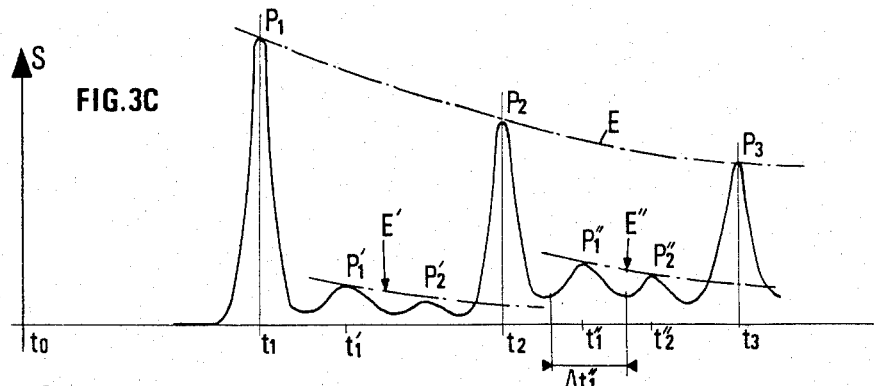
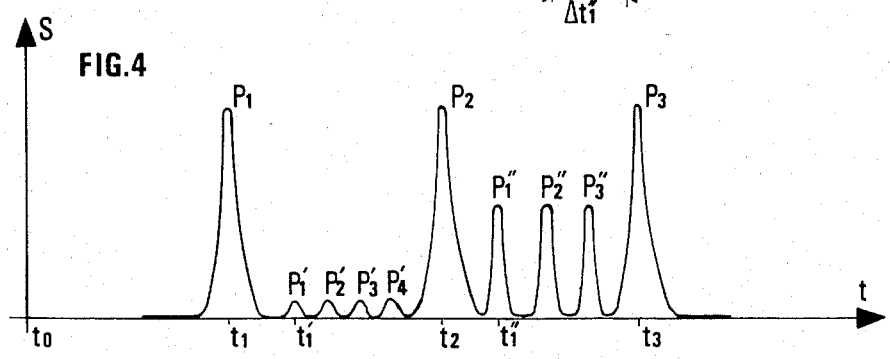

METHOD FOR DETERMINING THE DIP ANGLE OF GEOLOGICAL FORMATIONS TRAVERSED BY A BOREHOLE

BACKGROUND OF THE INVENTION

The present invention relates to a method for determining the dip angle of the geological formations traversed by a borehole.

Determination of the dip angle of geological formations using magnetic measurements is already known, for example, from U.S. Pat. No. 3,388,323.

Other dipmeters are operated based on the measurement of the electrical resistivity of the geological formations along a plurality of generatrices of the borehole wall.

Such measurments are carried out by means of a sonde provided with electrodes which must be placed in the immediate vicinity of the geological formations.

Dipmeters are also known which are operated based on the measurement of the velocity or of the propagation time of an acoustic wave through the geological formations, along a direction substantially parallel to the axis of the drilled wellbore.

Such dipmeters are, for example, described in U.S. Pat. Nos. 3,295,100, 3,376,950 and 3,526,874.

When the borehole is filled with electrically insulating drill muds, such as oil-containing muds, the dip cannot be determined by using electrical electrodes.

Similarly, when a casing must be inserted into the borehole to prevent collapsing of its wall before all the necessary measurements have been carried out, it is no longer possible to measure the electrical resistivity of the geological formations in order to determine their dip angle, by using the above-indicated dipmeters.

SUMMARY OF THE INVENTION

These drawbacks are obviated according to the invention by providing a method for determining the dip angle of group formations using reflected signals of an acoustic wave against the borehole wall at the level of the geological formations. This method is based on a correlation between the signals received along several generatrices of the borehole wall, with the position of these generatrices being known with respect to a reference system.

BRIEF DESCRIPTION OF THE DRAWINGS

The invention will be understood and all its advantages made clearly apparent from the following description, illustrated by the accompanying drawings, wherein:

FIGS. 3A, 3B and 3C show the general shape of the signals delivered by the sonde, corresponding to the three embodiments illustrated in FIGS. 2A, 2B and 2C respectively, and FIG. 4 shows a signal similar to that shown in FIG. 3C after processing through a logarithmic amplifier.

DETAILED DISCUSSION OF THE INVENTION

Figure 1:
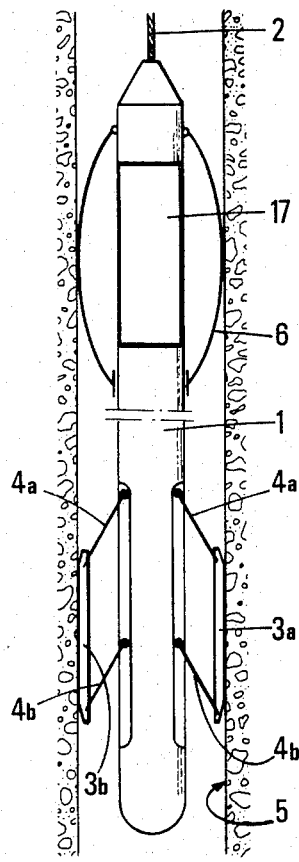
FIG. 1 diagrammatically illustrates an acoustic sonde for carrying out the method according to the invention.

In FIG. 1, reference 1 designates the sonde body suspended from a handling cable 2, in which can be embedded electrical conductors transmitting to the sonde the electric power necessary for its operation and transmitting to the surface the signals delivered by the sonde.

The sonde body is for example provided with four measuring pads diametrically opposed by pairs. Only two of these pads have been shown at 3a and 3b. They are connected with the sonde body through a mechanism which is not shown in detail, comprising articulated arms 4a and 4b, for displacing the pads relative to the axis of the sonde body, and press these pads against the borehole wall 5 during the measurements. The sonde body 1 is also equipped with centering means which may be of any known type.

Figure 2A:
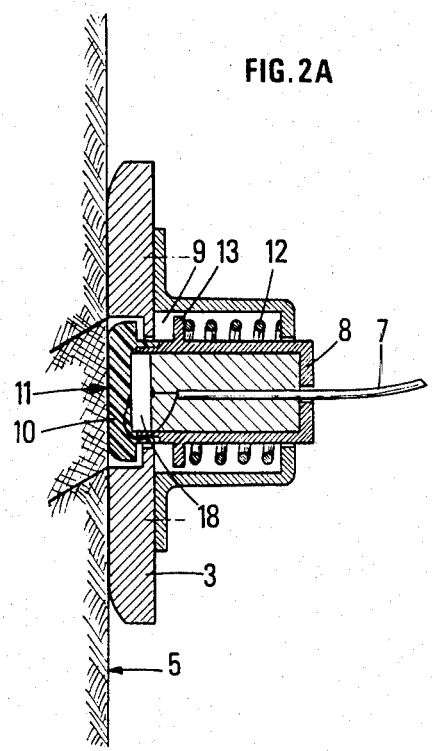
FIG. 2A shows a measuring pad located in a borehole directly in contact with the geological formations.

Each acoustic measuring pad may be, for example, of the type described in U.S. Pat. No. 3,883,841 of Applicant. Briefly speaking and as shown in FIG. 2A, each pad comprises a transmitterreceiver or transducer 18 of acoustic waves, of the piezo-electric type, which delivers an electrical pulse upon reception of an electrical signal transmitted by the cable 7 and which delivers an electrical signal transmitted by the cable 7 upon reception of an acoustic pulse. The transmission and reception diagram of the transducer 18 is of a selected very directional type. Moreover, the transducer 18 is so positioned as to transmit signals in a direction substantially peripendicular to the sonde axis and receives the acoustic waves which are reflected perpendicularly to the sonde axis.

The transducer 18 is located in a casing 8 housed in a recess 9 of the measuring pad 3. At least an intermediary element or feeler 10, integral with the casing 8 is positioned between the transducer 18, with which this element is in contact, and the borehole wall.

The outer wall 11 of the feeler 10 is such that it perfectly fits the borehole wall 5. Resilient means 12, such as a spring positioned between the bottom of the recess 9 and a shoulder 13 of the casing 8, hold the feeler 10 in contact with the borehole wall by displacing the casing perpendicularly to the sonde axis.

The intermediary element 10 is preferably made of a polyimide, such as the one commercially available under the Trade Mark "Vespel", optionally containing graphite charges. It will however, also be possible to use other materials such as an epoxy resin, for example, that sold under the Trade Mark "Araldite".

Thus, the thickness and the acoustic characteristics of the intermediary element are accurately known.

The sonde is also provided with diameter gage means indicating the diameter of the borehole at the level where the feeler 11 is in contact with the borehole wall 5. Such means are already known in the art and need not to be described in detail. For example, such means will indicate the value of the borehole diameter by sensing the rotation of the articulated arms 4a and 4b.

The operation of a measuring pad is indicated below by successively considering the cases where the borehole wall 5 is constituted by the geological formations themselves, by a mud cake at the contact of these formations, and by a casing cemented in the drilled hole.

In the first case, the feeler 10 is directly in contact with the geological formations, as illustrated in FIG. 2A. The train of signals S delivered by the transmitter-receiver 18 after the transmission of an acoustic wave is of the type digrammatically shown in FIG. 3A, which shows the evolution of this signal train versus time, starting from the time of emission $t_0$.

There is first observed at the instant $t_1$ a first peak $P_1$ which corresponds to the first reflection of a acoustic signal on the interface between the feeler 10 and the geological formation, this interface being designated by $I_1$ in the following. The acoustic wave is then reflected by the interface $I_0$ between the transducer 18 and the feeler 10. A part of the so-reflected acoustic energy is directed again towards interface $I_1$. This new reflection is represented by the peak $P_2$ appearing at the time $t_2$ and whose amplitude is smaller than that of the peak $P_1$. Similary there is observed a series of peaks of decreasing amplitudes $P_3$ . . . at the respective times $t_3$ . . . .

The geological formation on which the acoustic signal has been reflected can then be characterized by different significant elements of the signal train S either taken separately or in combination. These elements are (a) the geometrical envelope E of the signal S, drawn in mixed line in FIG. 3A, (b) the amplitude of anyone of peaks $P_1$, $P_2$ . . .

(c) the width or duration $\Delta t$ of anyone of peaks $P_1$, $P_2$ . . .

The time intervals $[t_0, t_1]$, $[t_1, t_2]$ are representative of twice the thickness of the feeler 10.

When the borehole wall is covered with a mud cake 14 (FIG. 2B), the signal train S delivered by the transducer 18 has the shape diagrammatically shown in FIG. 3B, i.e. includes peaks $P_1$, $P_2$, $P_3$ . . . , resulting from successive reflections of the acoustic wave on the interface between the feeler 10 and the mud cake 14, and peaks $P'_1$, $P'_2$, $P'_3$ . . . appearing at times $t'_1$, $t'_2$, $t'_3$ . . . respectively and resulting from successive reflections of the acoustic wave on the interface between the mud cake 14 and the geological formations. In the illustrated signal train S, it has been assumed that the travel or propagation time of the acoustic wave through the feeler 10 is greater than the travel time of this acoustic wave through the mud cake 14.

The time interval $[t_1, t'_1]$ corresponds to twice the thickness of the mud cake 14. It is thus possible to correct the value indicated by the diametering gage means of the sonde, so as to determine the actual diameter of the drilled hole at the level of the geological formations.

As above indicated, the mud cake 14 can be characterized by at least one of the following significant elements of the signal train S:

(a) geometrical envelope E of the peaks $P_1$, $P_2$, $P_3$ . . . exclusively, (b) amplitude of anyone of the peaks $P_1$, $P_2$, $P_3$ . . . , (c) width or duration $\Delta t$ of anyone of the peaks $P_1$, $P_2$, $P_3$, and (d) time interval between two consecutive peaks, such as $P'_1$, $P'_2$, $P'_3$.

Similarly, the geological formation on which the acoustic wave has been reflected to form the peaks $P'_1$, $P'_2$ . . . can be characterized by at least one of the following elements of the signal train S:

(a) geometrical envelope E' of the peaks $P'_1$, $P'_2$, $P'_3$ . . . exclusively, (b) amplitude of anyone of the peaks $P'_1$, $P'_2$, $P'_3$ . . . and, (c) width $\Delta t'$ of anyone of the peaks $P'_1$, $P'_2$, $P'_3$ . . .

Figure 2C:
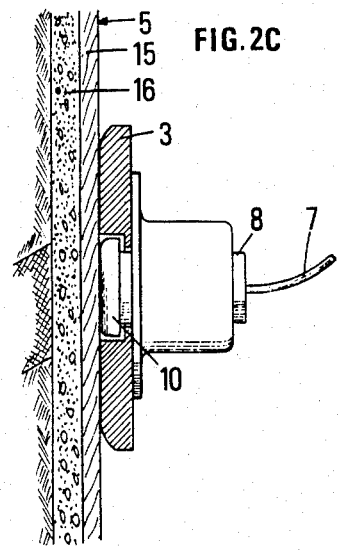
FIGS. 2B and 2C show a measuring pad, positioned in a borehole, whose central bore is separated from the traversed geological formations by a mud cake and a casing.
Figure 2B:
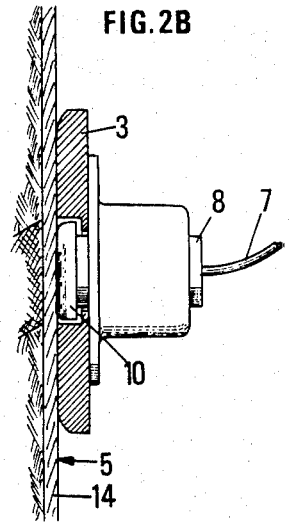

FIG. 2C illustrates the case of measurements performed in a borehole provided with a casing 15 held in place by a cement bond 16.

The signal train S delivered by the transmitter-receiver 18 is shown in FIG. 3C. This signal train comprises peaks $P_1$, $P_2$, $P_3$ resulting from the successive reflections of the acoustic wave on the interface between the feeler 10 and the casing 15. Peaks $P'_1$, $P'_2$ . . . also appear at the respective times $t'_1$, $t'_2$ . . . , these peaks resulting from the reflections of the acoustic wave on the interface 15 and the cement 16, and then peaks $P''_1$, $P''_2$, $P''_3$ . . . which appear at the respective times $t''_1$, $t''_2$, $t''_3$ . . . and result from the reflection of the acoustic waves on the interface between the cement 16 and the geological formation.

The time interval $[t_1, t'_1]$ is representative of twice the thickness of the casing 15, while the time interval $[t'_1, t''_1]$ is representative of twice the thickness of the cement layer separating the casing from the geological formation at the level where the measurement is performed. It is thus possible, taking into account the time interval $[t_1, t''_1]$ to correct the measurement delivered by the diametering gage means, so as to determine the actual diameter of the drilled borehole at the level of the geological formations.

As in the preceding case the casing 15 can be characterized by at least one of the following significant elements of the signal train S:

(a) envelope E of the peaks $P_1$, $P_2$ . . . exclusively, (b) amplitude of at least one of the peaks $P_1$, $P_2$, $P_3$ . . .

(c) width or duration $\Delta t$ of at least one of these peaks $P_1$, $P_2$, $P_3$ . . . and (d) time interval $[t_1, t'_1]$.

The cementing is characterized by at least one of the following elements of the signal train S:

(a) envelope E' of the peaks $P'_1$, $P'_2$, $P'_3$ . . . exclusively, (b) amplitude of at least one of the peaks $P'_1$, $P'_2$, $P'_3$ . . . , (c) width or duration $\Delta t'$ of the peaks $P'_1$, $P'_2$ . . . and, (d) time interval $[t'_1, t''_1]$.

Finally, the geological formation on which the acoustic wave has been reflected is characterized by at least one of the following significant element of the signal train S:

(a) envelope E'' of the peaks $P''_1$, $P''_2$, $P''_3$ . . . exclusively, (b) amplitude of at least one of the peaks $P''_1$, $P''_2$ . . . and, (c) width or duration $\Delta t''$ of the peaks $P''_1$, $P''_2$, $P''_3$ . . .

However, it must be observed that proper cementing of the casing has been assumed, i.e. that any air or liquid film of a noticeable thickness does not exist between the cement 16 and the casing 15 any air or liquid film of a noticeable thickness which would reduce in practice the amplitudes of the peaks $P'_1$, $P'_2$ . . .

As a matter of fact, when cementing of the casing is of insufficient quality, the acoustic energy is absorbed for the greatest part at the level of the interface between the casing 15 and the cement 16 and the peaks $P''_1$, $P''_2$ . . . have an insufficient amplitude to be detected in the signal train S.

The sonde illustrated in FIG. 1 may also comprise means, diagrammatically shown at 17, which make it possible to ascertain:

(a) the position of the sonde body and thus of the measuring pads, with respect to a determined fixed direction such as the magnetic north. The means used this ends, which may be of any known type, may comprise, for example, but not limitatively, three magnetic sensors such as flux gates positioned at right angles to each other and having a fixed position relative to the sonde body;

(b) the inclination of the borehole at the location of the sonde; the means used to this end may be of any known type and comprise, for example, three accelerometers perpendicular to each other by pairs, or also a pendulum, etc.

Obviously, the exact profile of the borehole may determined in a preliminary step, for example, during the drilling operation.

Determination of the dip angle of the geological formations is effected by displacing the sonde (FIG. 1) in the borehole and recording, in relation with the position of the sonde in the borehole, the signal trains delivered by the four measuring pads which are thus displaced along determined generatrices of the borehole wall, these recordings taking optionally into account the orientation and inclination of the sonde, depicting each signal train by at least a group of the aboveindicated significant elements, correlating the group of significant elements of the signals obtained along one generatrix with the corresponding group of significant elements obtained along the other generatrices, then determining the distances or gap separating the respective depths at which are received for said different generatrices signal trains corresponding to one and the same geological formation, said signal trains being identified as those for which the correlation is maximum between the signals received along said different generatrices. These distances or gaps are a function of the dip angle of the geological formation.

This correlation can be effected on the entire signal train S delivered by each pad of the sonde, or on at least one group of significant elements of each signal trains, such as the amplitude of the peaks resulting from the reflection of the acoustic wave on the geological formations, the width of these peaks, the geometrical envelope of these peaks, the thickness of the mud cake, etc .

The correlation makes it possible to determine the depths at which the reflected signal trains, received by the sonde at points located respectively on three generatrices of the borehole wall, whose positions and orientations are accurately known, are sufficiently close to each other, so that these depths correspond to the same geological formation. The respective levels of intersection of each geological formation with these three generatrices are derived therefrom. Taking into account the true value of the borehole diameter at the level of the geological formations (indicated by the measurements of the diametering gage means, optionally corrected as above indicated), the inclination and the orientation of the borehole (measured for example by the means 17), there is deduced the dip angle of the geological formations which corresponds to the interval for which is obtained the maximum correlation between the signal trains or the significant elements thereof.

The above description refers to the use of a pad provided with an acoustic transducer and sliding along the borehole wall. It would be however possible, without departing from the scope of the present invention, to use a sonde with a rotating pad such as described in the published French Patent Application No. 2,448,621, or any other acoustic sonde whose measuring means is not in contact with the borehole wall, provided that these sondes are adapted to transmit an acoustic wave in a direction substantially perpendicular to the borehole axis.

It is also possible to process the signal trains delivered by the sonde by using logarithmic amplifiers enabling the signal trains delivered by the sonde to be so transformed as to derive from reflections emanating from one and the same interface peaks having the same amplitude, as shown in FIG. 4 which corresponds to the signal trains of FIG. 3C processed by a logarithmic amplifier.

What is claimed is:

1. A method for determining the dip angle of geological formations traversed by a borehole of known orientation and inclination, comprising transmitting an acoustic signal in a direction substantially perpendicular to the borehole axis from different vertical levels of at least three determined generatrices of the borehole wall, and receiving from the same direction at the different vertical levels of these generatrices the acoustic wave which has been reflected at least on the interface between the borehole and the geological formations, producing a signal train representative of the reflected acoustic wave, depicting each signal train by at least one group of significant elements of this signal train, correlating the group of significant elements of the signals obtained along one generatrix with the corresponding groups of significant elements obtained along the other generatrices, and determining the differences between the respective depths at which there are received on said different generatrices signal trains corresponding to one and the same geological formation, said differences being equal to the vertical distances separating the borehole levels which correspond to the maximum correlation between the signals received on said different generatrices, and said differences being representative of the dip angle of said geological formation.

2. A method according to claim 1, wherein the entirety of the signal trains delivered are correlated.

3. A method according to claim 1, wherein the group of significant elements of each signal trains comprise at least the amplitude of a peak representative of the reflection of the acoustic wave on the geological formations.

4. A method according to claim 1, wherein the group of significant elements of each signal train comprise at least the duration of a peak representative of the reflection of the acoustic wave on the geological formations.

5. A method according to the claim 1, wherein the group of significant elements of each signal train comprise at least the geometrical envelope of the peaks representative of the reflection of the acoustic wave on the geological formations.

6. A method according to claim 1, carried out in a borehole traversing geological formations covered by a mud cake, wherein the group of significant elements of each signal train comprise at least the portion of the signal train which represents the thickness of the mud cake layer covering the geological formations.

7. A method according to claim 1 further comprising conducting said transmitting and receiving of said acoustic signals with single transducers of the piezoelectric type along each of said generatrices and each of said single transducers being capable of both transmitting and receiving acoustic waves along a single axis thereof.

8. A method according to claim 7 wherein said acoustic transmissions are conducted with said transducers in contact with the borehole wall.

9. A method according to claim 8 wherein said transducers are placed into contact with the borehole wall by means of articulable arms, and further comprising determining the diameter of the borehole as a function of the amount of rotation of said articulable arms necessary to place said transducers in contact with the borehole wall.

* * * * *